United States Patent
Kimura et al.

[11] Patent Number: 6,153,125
[45] Date of Patent: Nov. 28, 2000

[54] $BAM_2O_4$ OXIDE SINGLE CRYSTAL HAVING NON-LINEAR OPTICAL PROPERTY AND MANUFACTURING METHOD THEREOF

[75] Inventors: Hideo Kimura; Mitsunori Sato, both of Ibaraki, Japan

[73] Assignee: National Research Institute For Metals, Ibaraki, Japan

[21] Appl. No.: 08/904,610

[22] Filed: Aug. 1, 1997

[30] Foreign Application Priority Data

Aug. 2, 1996 [JP] Japan .................................. 8-204376

[51] Int. Cl.[7] .............................. G02B 5/20; C01B 35/10
[52] U.S. Cl. .......................... 252/584; 423/277; 117/36; 117/78
[58] Field of Search .................. 252/582, 584; 423/277, 600, 624; 117/13, 36, 73, 78

[56] References Cited

U.S. PATENT DOCUMENTS

| | | | |
|---|---|---|---|
| 5,343,327 | 8/1994 | Chai et al. | 252/584 |
| 5,523,026 | 6/1996 | Chen et al. | 252/582 |
| 5,614,129 | 3/1997 | Hofmeister et al. | 252/584 |
| 5,684,813 | 11/1997 | Keszler | 252/584 |
| 5,833,939 | 11/1998 | Kimura et al. | 423/277 |
| 5,959,765 | 9/1999 | Kakamura | 252/584 |

FOREIGN PATENT DOCUMENTS 63-206393  8/1988  Japan .

*Primary Examiner*—Philip Tucker
*Attorney, Agent, or Firm*—Wenderoth, Lind & Ponack, L.L.P.

[57] ABSTRACT

An oxide single crystal having a nominal composition expressed $BaM_2O_4$ (M is at least an element selected from the group consisting of Al and Ga), M of which is partially substituted with B, is provided. The $BaM_2O_4$ oxide single crystal has an asymmetric central portion formed around B and thereby exhibits a non-linear optical property.

5 Claims, 2 Drawing Sheets

$BaM_2O_4$ OXIDE SINGLE CRYSTAL HAVING NON-LINEAR OPTICAL PROPERTY AND MANUFACTURING METHOD THEREOF

FIELD OF THE INVENTION

The present invention relates to a $BaM_2O_4$ oxide single crystal having a nonlinear optical property and a manufacturing method thereof More particularly, the present invention relates to a new oxide single crystal having an excellent non-linear optical property, which is useful for an optical field including a laser and wave changing devices.

DESCRIPTION OF THE PRIOR ART

Non-linear technology developed together with laser handles optical harmonic generation, photomixing and induced diffusion as a typical phenomenon. These phenomena are not only objectives for a scientific research but also applicable to a wide range of practical technology. For example, optoelectronics such as generation, control and measurement of a coherent light, non-linear spectroscopy which seeks physical properties through non-linear effects, and several applications to laser, which are based on the knowledge and technology of optoelectronics and non-linear spectroscopy, are known and these are important for a basic technology to develop electronics, communication and information engineering.

With respect to materials having a non-linear effect, there have been conventionally known ADP (adenosine diphosphate), $Ba_2NaNb_5O_{15}$ (barium and sodium niobate), CdSe (cadmium selenide) and KDP (potassium diphosphate). These materials have been made a good use of their properties in accordance with several uses, but as applications of the non-linear optical effects increase, a new material, which is easily and reproductively manufactured as crystals with good quality, is now required.

On the other hand, a method of manufacturing a $BaM_2O_4$ (M: Al, Ga) single crystal has been conventionally known, in which the single crystal is made from melt having a stoichiometric composition and melting point from 1830° C. to 1850° C. This single crystal is easily manufactured, but does not have a non-linear optical effect because it has crystalline symmetry of a hexagonal system and a center of symmetry exists in it. Several researches for crystals as a bulk material, which does not have a center of symmetry in the whole, have been tried, but such crystals are often difficult to produce.

The present invention has an object to provide a new oxide single crystal having an excellent non-linear optical property, which is easily and reproductively produced.

This and other objects, features and advantages of the invention will become more apparent upon a reading of the following detailed description and drawings.

DETAILED DESCRIPTION OF THE INVENTION

Figure 1:
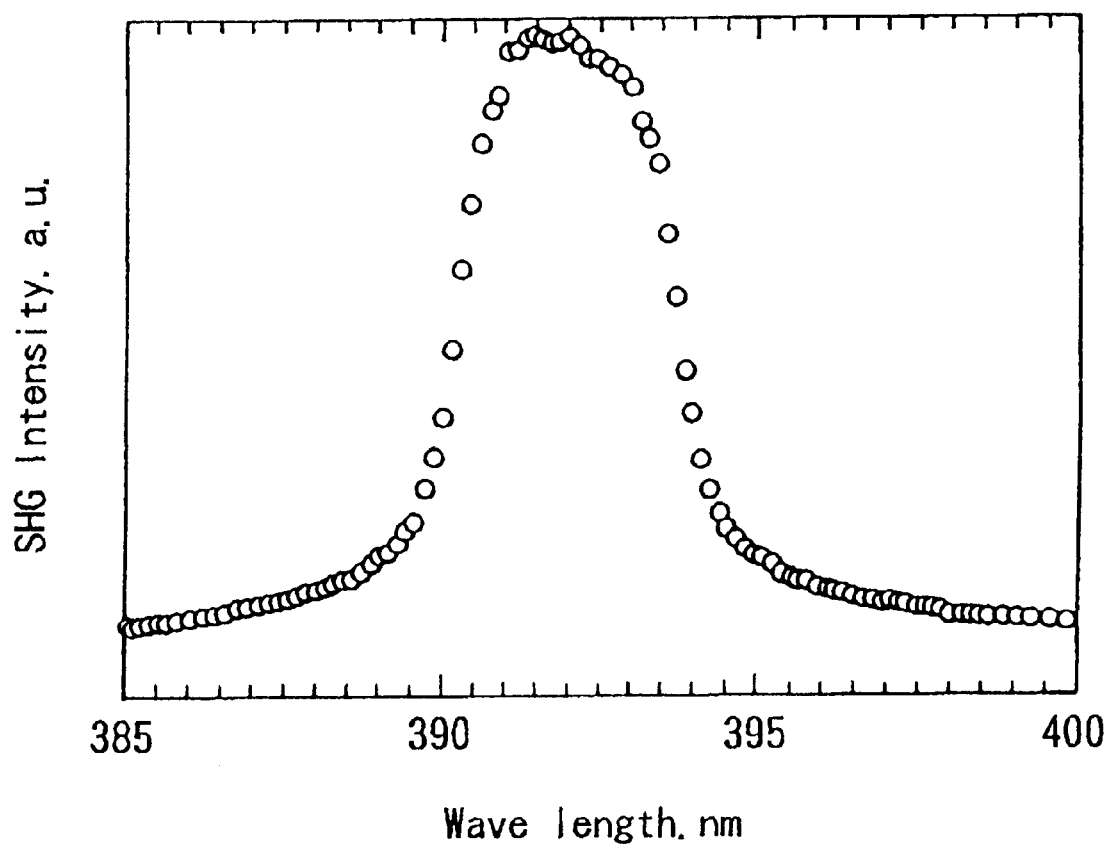
FIG. 1 depicts intensity of a higher harmonic wave generated by irradiating $Ti:Al_2O_3$ laser with wavelength of 785 nm to a Ba $(Al_{0.95}B_{0.05})_2O_4$ oxide single crystal of the present invention.

The present invention provides an oxide single crystal having a nominal composition expressed $BaM_2O_4$ (M is at least an element selected from the group consisting of Al and Ga), said M being partially substituted with B, wherein an asymmetric central portion is formed around said B and said oxide single crystal exhibits a non-linear optical property.

The present invention also provides a method of manufacturing an oxide single crystal comprising the steps of melting raw materials, which have a nominal composition expressed $BaM_2O_4$(M is at least an element selected from the group consisting of Al and Ga), with B to partially substitute M with B and giving a single crystal a non-linear optical property by forming an asymmetric central portion around said B while growing a single crystal from melt.

According to the present invention, a new oxide single crystal having a nonlinear optical property is provided. The crystal is one with good quality, which does not have a center of symmetry in the whole. The crystal is easily and reproductively produced and thereby its manufacturing cost is diminished. The crystal will be useful not only for an optical field such as a laser or wave changing devices but also for other technological fields.

Embodiments

In the present invention, a $BaM_2O_4$(M: Al, Ga or both) single crystal, which does not typically have a non-linear effect, is given a non-linear optical property by substituting a part of M with B and by forming an asymmetric central portion around the B. $BaAl_2O_4$ and $BaGa_2O_4$ single crystals, which have a center of symmetry, change into crystals not having the center of symmetry by substituting a part of Al, Ga or both with B which has a different ion radius from that of them. This change occurs in accordance with the fact that distances between lattices in the crystal change and the crystal is distorted thereby. Generally, an additive to an oxide results in deterioration of single crystal growth. There has been no conception to manage to add any additive to $BaM_2O_4$(M: Al, Ga) whose single crystallization is easy.

As a center of symmetry disappears, symmetry of dielectric polarization is destroyed. When laser is introduced into the crystal, a waveform is distorted and has a higher harmonic portion to obtain a secondary and tertiary higher harmonic waves. Any crystal having a center of symmetry does not exhibit these phenomena.

With respect to a substitution range of M, when the substitution is explained in the formula of $(M_{1-x}B_x)$, for example, a non-linear effect is insufficient in the case of $x \leq 0.001$ and crystallization is difficult when $0.15 \leq x$. Consequently, in the present invention, $0.001 < x < 0.15$ is exemplified as a preferable range.

In the present invention, either a pulling or floating zone method would be adopted to a manner of producing a single crystal because $BaM_2O_4$(M: Al, Ga or both) has a center of symmetry and is easily produced as a single crystal. An oxide single crystal of the present invention is therefore manufactured easily. Furthermore, addition of B decreases melting point of an oxide single crystal to cause single crystallization to be easier.

Now, examples of the present invention will be followed. It is needless to mention that the invention is not restricted to examples.

EXAMPLE 1

Oxide raw materials in amount of 200 g having a stoichiometric composition of $BaAl_2O_4$ whose melting point is 1840° C. are melt in the air in a crucible made of Ir with diameter and height of 50 mm, which is disposed in a general induction heating pulling furnace. B is added to the melt and thereby Al is substituted with B of x=0.05. A single crystal is grown from the melt whose composition is Ba(Al$_{1-}$ $_xB_x)_2O_4(x=0.05)$, namely $Ba(Al_{0.95}B_{0.05})_2O_4$. Specifically, a seed crystal with diameter and length of 2 mm and 50 mm, respectively, is dipped in the melt while the seed crystal is rotated at a rate of 20 rpm. After a half an hour, the seed crystal is pulled at a rate of 3 mm/hr, at a tip of which a prescribed crystal is formed. A single crystal with diameter and length of 20 mm and 30 mm, respectively, at a straight body is produced by pulling for ten hours. When laser of Ti:Al$_2$O$_3$ with wavelength of 785 nm is irradiated to the single crystal at a room temperature(25° C.), a higher harmonic wave with wavelength of 392 nm, as depicted in FIG. 1, is observed and thereby a non-linear optical effect is confirmed.

The same result is obtained when substitution of B is conducted before melting raw materials. The same result is also obtained for $Ba(Ga_{1-x}B_x)_2O_4(x=0.05)$. Furthermore, the same result is obtained for a single crystal produced by a halogen-heating type of floating zone apparatus.

EXAMPLE 2

Raw materials in amount of 200 g having a stoichiometric composition of $Ba(Al,Ga)_2O_4(Al:Ga=1:1)$ whose melting point is 1830° C. are melt in the air in the same crucible and induction heating pulling furnace as in Example 1. A single crystal is produced from a melt of $Ba((Al,Ga)_{1-x}B_x)_2O_4(x=0.05)$, namely $Ba((Al,Ga)_{0.95}B_{0.05})_2O_4$. A seed crystal with diameter and length of 2 mm and 50 mm, respectively, is dipped in the melt while the crystal is rotated at a rate of 20 rpm. The seed crystal is pulled at a rate of 3 mm/hr after a half an hour, at a tip of which a prescribed crystal is formed. A single crystal with diameter and length of 20 mm and 30 mm, respectively, at a straight body is produced by pulling for ten hours. When laser of Ti:Al$_2$O$_3$ with wavelength of 785 nm is irradiated to the single crystal at a room temperature(25° C.), a higher harmonic wave with wavelength of 392 nm, which is similar to one which is depicted in FIG. 1, is observed and thereby a non-linear optical effect is confirmed. Intensity of a higher harmonic wave equal to or stronger than that in the case of original M of BaM$_2$O$_4$ is a single element such as in Example 1 is possible to gain.

When a ratio of Al and Ga is changed, the same result is obtained. The same result is also obtained when an oxide single crystal is produced by a halogen-heating type of floating zone furnace.

(Comparison)

Figure 2:
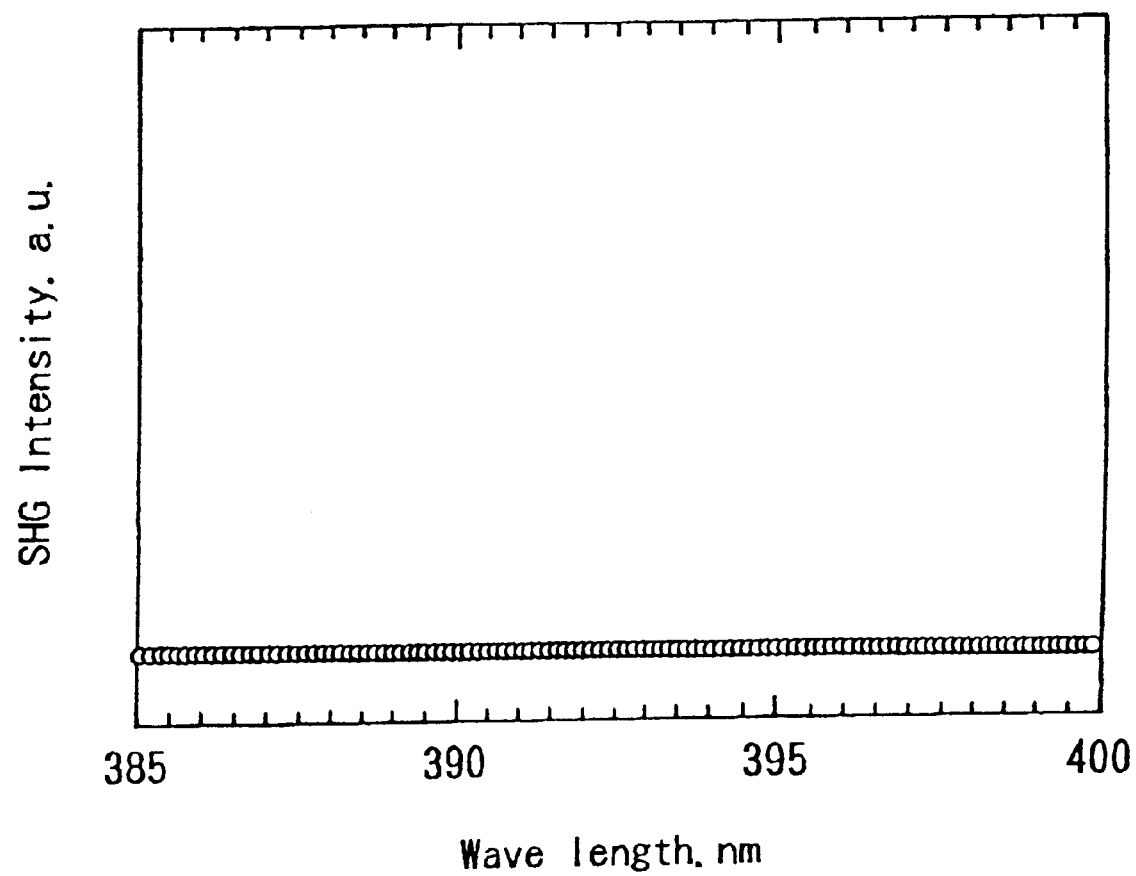
FIG. 2 depicts, as a comparison, intensity of a higher harmonic wave generated by irradiating $Ti:Al_2O_3$ laser with wavelength of 785 nm to a $BaAl_2O_4$ oxide single crystal, of which Al is not substituted with B.

Raw materials in amount of 200 g having a stoichiometric composition of BaAl$_2$O$_4$ whose melting point is 1850° C. are melt in the air in the same crucible and induction heating pulling furnace as in Examples 1 and 2. A single crystal is grown from a melt as it is. A seed crystal with diameter and length of 2 mm and 50 mm, respectively, is dipped in the melt while the crystal is rotated at a rate of 20 rpm. The seed crystal is pulled at a rate of 3 mm/hr after a half an hour, at a tip of which a prescribed crystal is formed. A single crystal with diameter and length of 20 mm and 30 mm, respectively, at a straight body is produced by pulling for ten hours. When laser of Ti:Al$_2$O$_3$ with wavelength of 785 nm is irradiated to the single crystal at a room temperature(25° C.), any higher harmonic wave is not observed as depicted in FIG. 2. Consequently, it is confirmed that substitution of B as shown in Examples 1 and 2 gives an oxide single crystal a non-linear property.

What is claimed is:

1. An oxide single crystal having a nominal composition expressed $Ba(M_{1-x}B_x)_2O_4$, wherein M is an element selected from the group consisting of Al and Ga, x is greater than 0.001 and less than 0.15, and an asymmetric central portion is formed around the B atom, said oxide single crystal exhibits a non-linear optical property.

2. The oxide of claim 1, wherein M is both Al and Ga.

3. The oxide of claim 2, wherein the ratio of Al to Ga is 1:1.

4. A method of manufacturing an oxide single crystal comprising melting a raw material having the nominal composition BaM$_2$O$_4$ wherein M is an element selected from the group consisting of Al and Ga, with B to partially substitute M with B in the resulting melt, and forming an asymmetric central portion around B while growing a single crystal from the melt to yield a single crystal having a non-linear optical property.

5. The method of claim 4, wherein greater than 0.001 and less than 0.15 of M is replaced with B.

* * * * *